(12) United States Patent
Matsunaga et al.

(10) Patent No.: US 12,085,918 B2
(45) Date of Patent: Sep. 10, 2024

(54) SYNCHRONOUS CONTROL DEVICE, SYNCHRONOUS CONTROL SYSTEM, SYNCHRONOUS CONTROL METHOD, AND SIMULATION DEVICE

(71) Applicant: OMRON Corporation, Kyoto (JP)

(72) Inventors: Daisuke Matsunaga, Otsu (JP); Toru Kogawara, Kyoto (JP); Junji Shimamura, Takatsuki (JP)

(73) Assignee: OMRON Corporation, Kyoto (JP)

( * ) Notice: Subject to any disclaimer, the term of this patent is extended or adjusted under 35 U.S.C. 154(b) by 521 days.

(21) Appl. No.: 17/294,421

(22) PCT Filed: Nov. 22, 2019

(86) PCT No.: PCT/JP2019/045785
§ 371 (c)(1),
(2) Date: May 17, 2021

(87) PCT Pub. No.: WO2020/137286
PCT Pub. Date: Jul. 2, 2020

(65) Prior Publication Data
US 2022/0019197 A1    Jan. 20, 2022

(30) Foreign Application Priority Data

Dec. 27, 2018 (JP) ................................ 2018-246020

(51) Int. Cl.
*G05B 19/41* (2006.01)
*G05B 19/4155* (2006.01)
(52) U.S. Cl.
CPC ............ *G05B 19/4155* (2013.01); *G05B 2219/34402* (2013.01)

(58) Field of Classification Search
CPC ...... G05B 19/4155; G05B 2219/34402; G05B 2219/50216; G05B 2219/50226;
(Continued)

(56) References Cited

U.S. PATENT DOCUMENTS 6,147,468 A    11/2000   Hamamura et al.
2002/0003416 A1   1/2002   Sagasaki et al.
(Continued)

FOREIGN PATENT DOCUMENTS

CN    1245567    2/2000
CN    102129251   7/2011
(Continued)

OTHER PUBLICATIONS

Office Action of Japan Counterpart Application, with English translation thereof, issued on Feb. 8, 2022, pp. 1-7.
(Continued)

*Primary Examiner* — Christopher W Carter
(74) *Attorney, Agent, or Firm* — JCIPRNET

(57) ABSTRACT

A synchronous control device (10) includes a spindle control part (11*a*) and a driven shaft control part (11*b*). The driven shaft control part (11*b*) includes a driven shaft command position variation suppression part (114) which generates as a driven shaft command phase (Ps) a projected driven shaft command phase obtained by adding an advance angle amount (Pa) corresponding to a spindle speed to a spindle phase (Pm) in a case where a sign of the spindle speed is reverse from a previous period, and generates as the driven shaft command phase (Ps) a value in which a sign of a shift from the driven shaft command phase in the previous period is not reverse from the sign of the spindle speed in a predetermined case where the sign of the spindle speed is not reverse from the previous period.

9 Claims, 8 Drawing Sheets

(58) Field of Classification Search
CPC .......... G05B 19/19; G05B 2219/50229; G05B 2219/50234; G05B 19/4144; H02P 5/46
See application file for complete search history.

(56) References Cited

U.S. PATENT DOCUMENTS

| | | | | |
|---|---|---|---|---|
| 2005/0168178 | A1* | 8/2005 | Toyozawa | G05B 19/19 318/68 |
| 2008/0218116 | A1* | 9/2008 | Maeda | G05B 19/19 318/632 |
| 2011/0088523 | A1* | 4/2011 | Yamada | G05B 19/4141 82/1.11 |
| 2013/0002185 | A1* | 1/2013 | Hosomi | G05B 19/416 318/625 |
| 2013/0317653 | A1* | 11/2013 | Ueda | G05B 19/4083 700/275 |
| 2015/0205282 | A1* | 7/2015 | Tezuka | G05B 19/416 700/160 |
| 2015/0362895 | A1 | 12/2015 | Horiguchi | |
| 2015/0378326 | A1* | 12/2015 | Idei | G05B 19/416 700/275 |
| 2018/0314233 | A1 | 11/2018 | Horiguchi et al. | |

FOREIGN PATENT DOCUMENTS

| | | |
|---|---|---|
| CN | 105278456 | 1/2016 |
| CN | 108803499 | 11/2018 |
| JP | H07104855 | 4/1995 |
| JP | 2004259214 | 9/2004 |
| JP | 2004328833 | 11/2004 |
| JP | 2010022145 | 1/2010 |
| JP | 2011067016 | 3/2011 |
| JP | 2012056066 | 3/2012 |
| JP | 2015120302 | 7/2015 |
| JP | 2016004435 | 1/2016 |

OTHER PUBLICATIONS

"Search Report of Europe Counterpart Application", issued on Nov. 11, 2022, p. 1-p. 9.

"International Search Report (Form PCT/ISA/210) of PCT/JP2019/045785," mailed on Feb. 10, 2020, with English translation thereof, pp. 1-4.

"Written Opinion of the International Searching Authority (Form PCT/ISA/237) of PCT/JP2019/045785," mailed on Feb. 10, 2020, with English translation thereof, pp. 1-6.

Lin Yang, "Application of Omron motion controller in multi-shaft color printing press", International Mechatronics Technology, Jun. 15, 2009, pp. 21-23, Issue 5.

Xianbo Zheng, "Application of LENZE9400 servo system in the transformation of PASSIM12K crimping unit", Science & Technology Information, Dec. 31, 2009, pp. 62-63, No. 1.

"Office Action of China Counterpart Application", issued on Dec. 6, 2023, with English translation thereof, pp. 1-16.

* cited by examiner (a)

(b)

(a)

(b)

SYNCHRONOUS CONTROL DEVICE, SYNCHRONOUS CONTROL SYSTEM, SYNCHRONOUS CONTROL METHOD, AND SIMULATION DEVICE

CROSS-REFERENCE TO RELATED APPLICATION

This application is a 371 application of the International PCT application serial no. PCT/JP2019/045785, filed on Nov. 22, 2019, which claims the priority benefits of Japan Patent Application No. 2018-246020, filed on Dec. 27, 2018. The entirety of each of the above-mentioned patent applications is hereby incorporated by reference herein and made a part of this specification.

BACKGROUND

Technical Field

The disclosure relates to a synchronous control device, a synchronous control system, a synchronous control method, and a simulation device.

Related Art

A technique for synchronously controlling multiple servomotors such as machine tools is known. In the synchronous control, in order to operate a driven shaft in synchronization with a spindle, position information of the spindle (spindle feedback position) is given as a driven shaft command position to a driven shaft servo control mechanism.

However, in such synchronous control, there are issues of communication delay and synchronization delay of the driven shaft due to tracking delay of the control target device. As a method for correcting the tracking delay, Patent Document 1 discloses a method in which the generated phase delay amount is added as a function of a phase change speed to a phase command to obtain a position command of the servo system. Also, in the field of synchronous control, in order to compensate for the synchronization delay of the driven shaft, an advance angle correction technique is known to reflect a value proportional to the speed of the spindle as a correction value (advance angle amount) in the driven shaft command position.

RELATED ART

Patent Document(s)

[Patent Document 1]: Japanese Patent Application Laid-Open No. 7-104855

SUMMARY

Problems to be Solved

However, further improvement is required for the synchronization of the driven shaft in the case where the movement of the spindle is accompanied with a change in the speed such as deceleration/stop.

In the advance angle correction technique, for example, when the spindle is moving in one direction but the spindle suddenly decelerates at a certain time point, the advance angle amount changes discontinuously. Thus, the driven shaft command position becomes discontinuous, and also, if the deceleration of the spindle is large, the decrease in the advance angle amount is large, so that a driven shaft command position reverse to the direction of the spindle may be generated.

Therefore, it is necessary to improve the generation of such an unnatural driven shaft command position.

One aspect of the disclosure is to realize synchronous control which further improves the accuracy of synchronous driving of a driven shaft.

Means for Solving the Problems

The disclosure adopts the following configuration in order to solve the above-mentioned problems.

A synchronous control device according to one aspect of the disclosure includes a spindle control part and a driven shaft control part. The spindle control part outputs a spindle command position to a spindle servo control mechanism. The driven shaft control part receives a spindle feedback position in the spindle servo control mechanism and outputs a driven shaft command position to a driven shaft servo control mechanism. The driven shaft control part includes: a phase calculation part which calculates a spindle phase based on the spindle feedback position; a speed calculation part which calculates a spindle speed based on the spindle feedback position; an advance angle amount calculation part which calculates an advance angle amount corresponding to the spindle speed; and a driven shaft command position generation part which generates the driven shaft command position based on a driven shaft command phase. The driven shaft control part further includes a driven shaft command position variation suppression part which calculates a projected driven shaft command phase obtained by adding the advance angle amount to the spindle phase, generates the projected driven shaft command phase as the driven shaft command phase in a case where a sign (positive/negative) of the spindle speed is reverse from a previous period, and generates as the driven shaft command phase a value in which a sign of a shift from the driven shaft command phase in the previous period is not reverse from the sign of the spindle speed in a predetermined case where the sign of the spindle speed is not reverse from the previous period.

A synchronous control method according to one aspect of the disclosure includes the following steps. In a spindle command position calculation step, a spindle command position is calculated with respect to a spindle servo control mechanism. In a spindle phase calculation step, a spindle phase is calculated based on a spindle feedback position in the spindle servo control mechanism. In a spindle speed calculation step, a spindle speed is calculated based on the spindle feedback position. In an advance angle amount calculation step, an advance angle amount corresponding to the spindle speed is calculated. In a driven shaft command position generation step, a driven shaft command position is generated based on a driven shaft command phase. In a projected driven shaft command phase calculation step, a projected driven shaft command phase is calculated by adding the advance angle amount to the spindle phase. In a driven shaft command position variation suppression step, the projected driven shaft command phase is generated as the driven shaft command phase in a case where a sign of the spindle speed is reverse from a previous period, and a value in which a sign of a shift from the driven shaft command phase in the previous period is not reverse from the sign of the spindle speed is generated as the driven shaft command phase in a predetermined case where the sign of the spindle speed is not reverse from the previous period.

Effects

According to the synchronous control device according to the one aspect of the disclosure, it is possible to realize synchronous control in which the accuracy of synchronous driving of the driven shaft is improved.

According to the synchronous control method according to the one aspect of the disclosure, it is possible to realize synchronous control in which the accuracy of synchronous driving of the driven shaft is improved.

Figure 4:
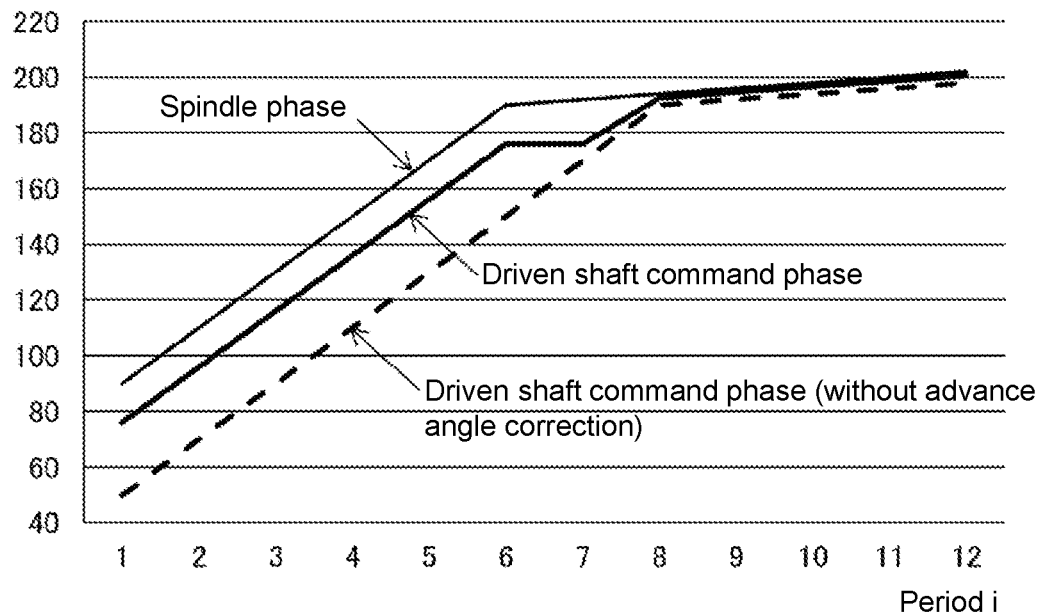
Figure 4:
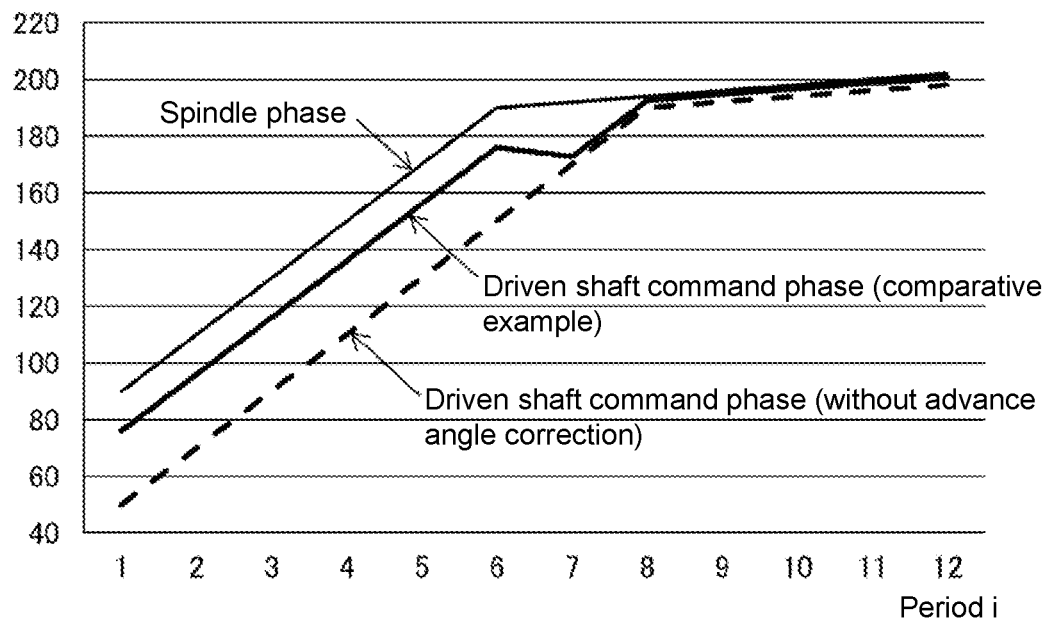

(a) of FIG. 4 shows a result example of the case of performing synchronous control by the synchronous control device according to Embodiment 1, and (b) of FIG. 4 shows a result example of the case of performing synchronous control by a synchronous control device of a comparative example.

Figure 5:
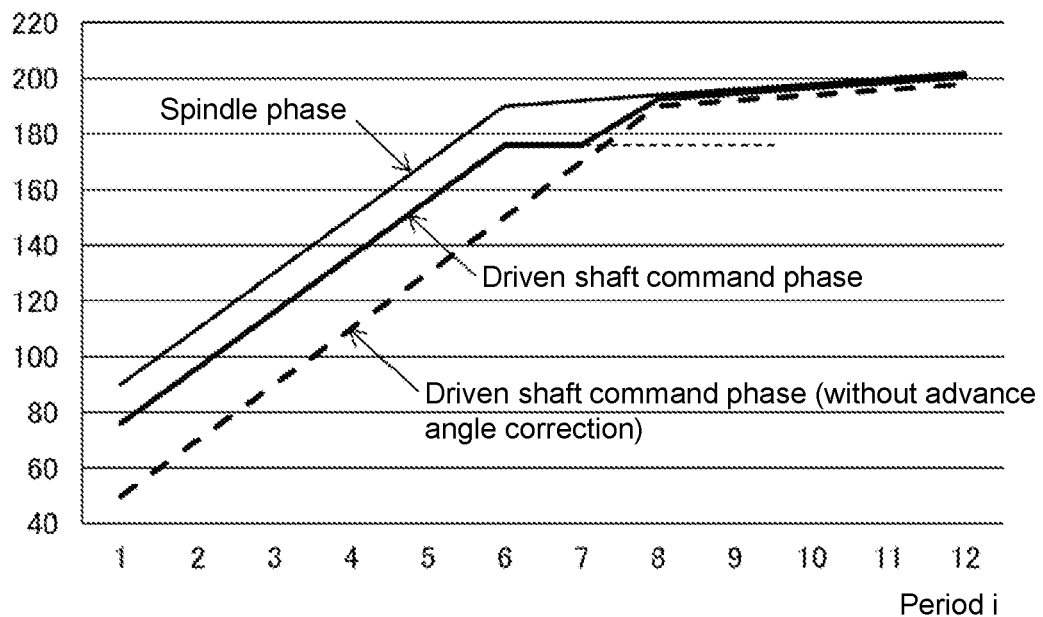
Figure 5:
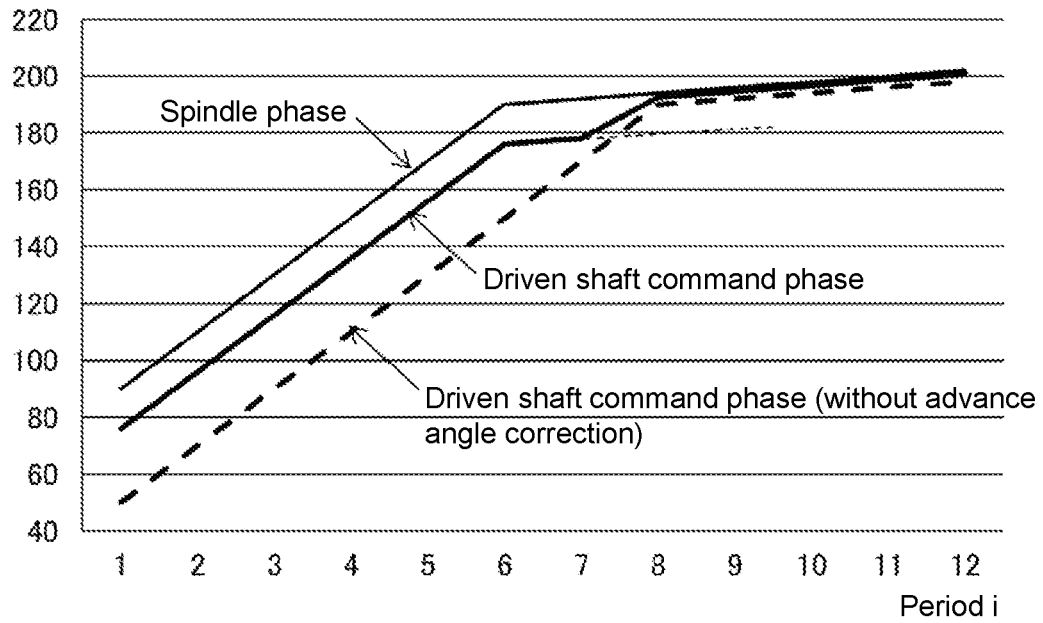

(b) of FIG. 5 shows a result example of the case of performing synchronous control by a synchronous control device according to Embodiment 2, and for comparison, (a) of FIG. 5 shows a result example of the case of performing synchronous control by the synchronous control device according to Embodiment 1.

Figure 6:
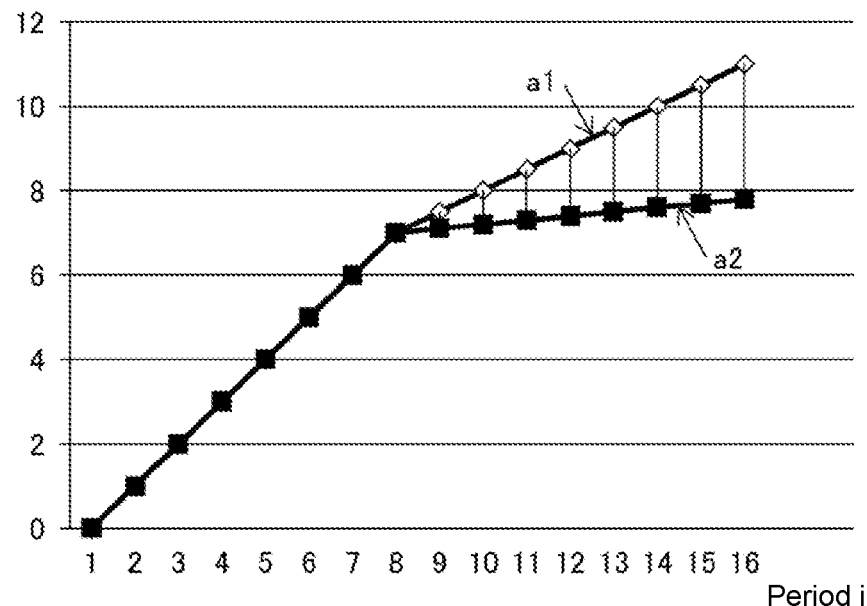
Figure 6:
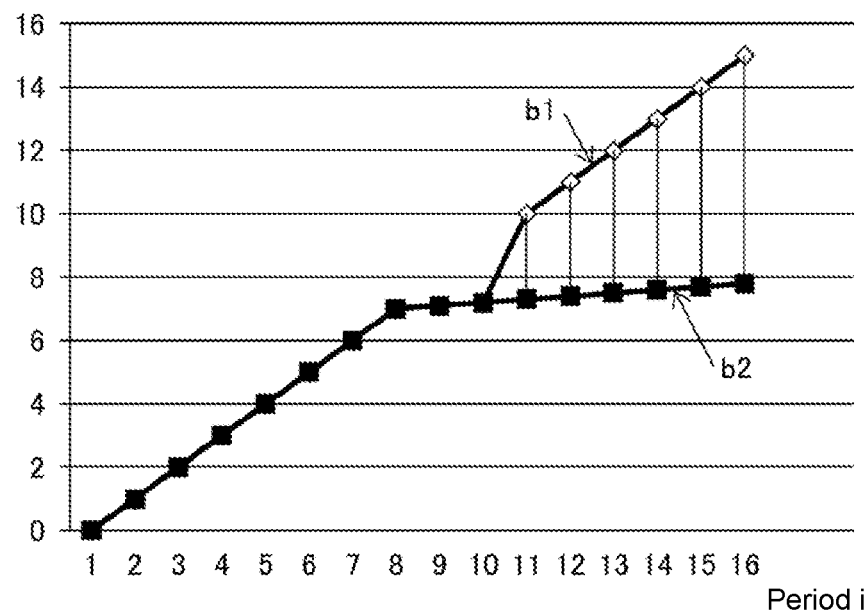

(a) and (b) of FIG. 6 show examples for describing operations of the case of performing synchronous control by a synchronous control device according to Embodiment 3, respectively.

Figure 7:
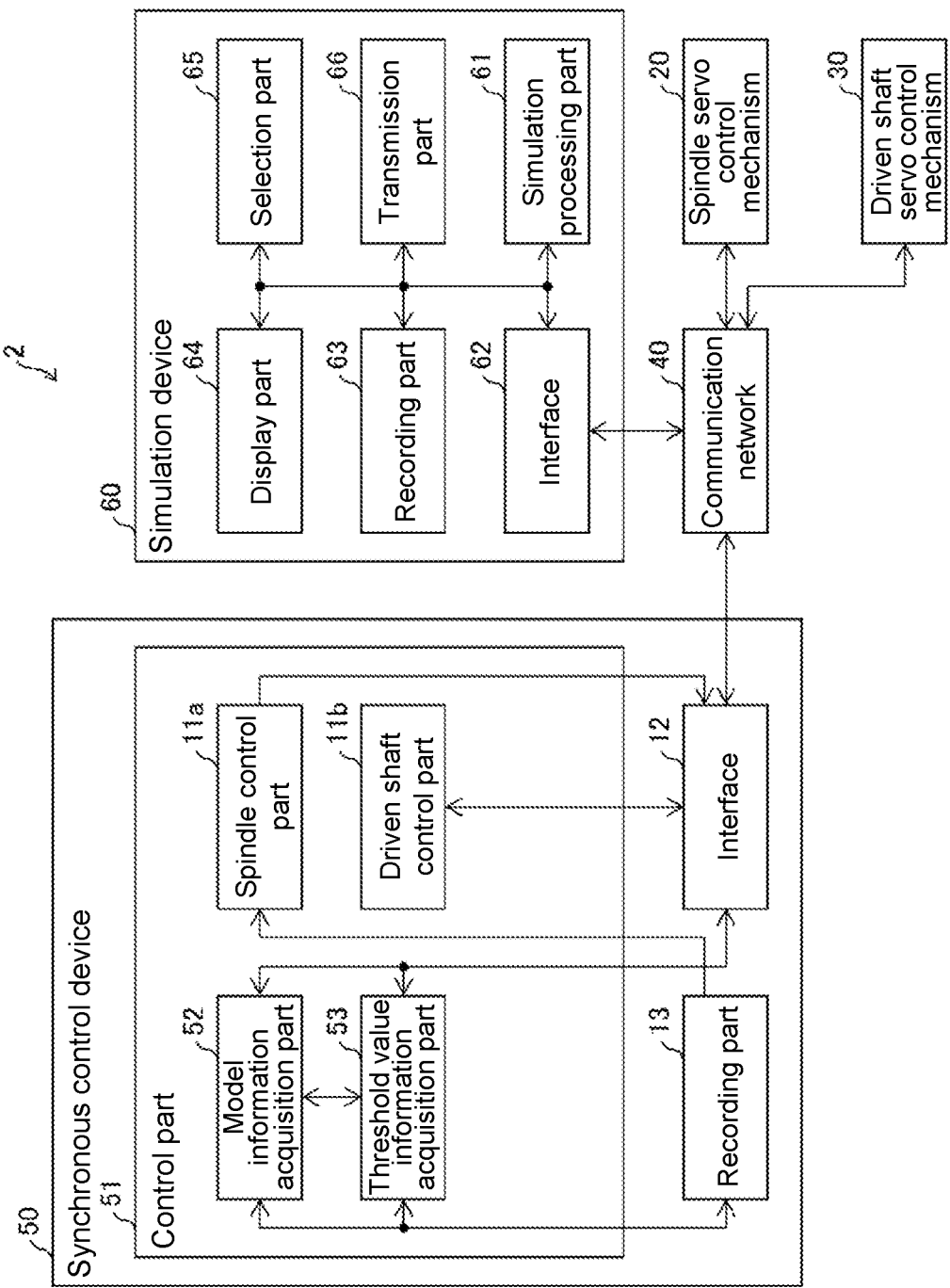

FIG. 7 is a schematic view showing a synchronous control system and a synchronous control device according to Embodiment 4 and Embodiment 5 of the disclosure.

Figure 8:
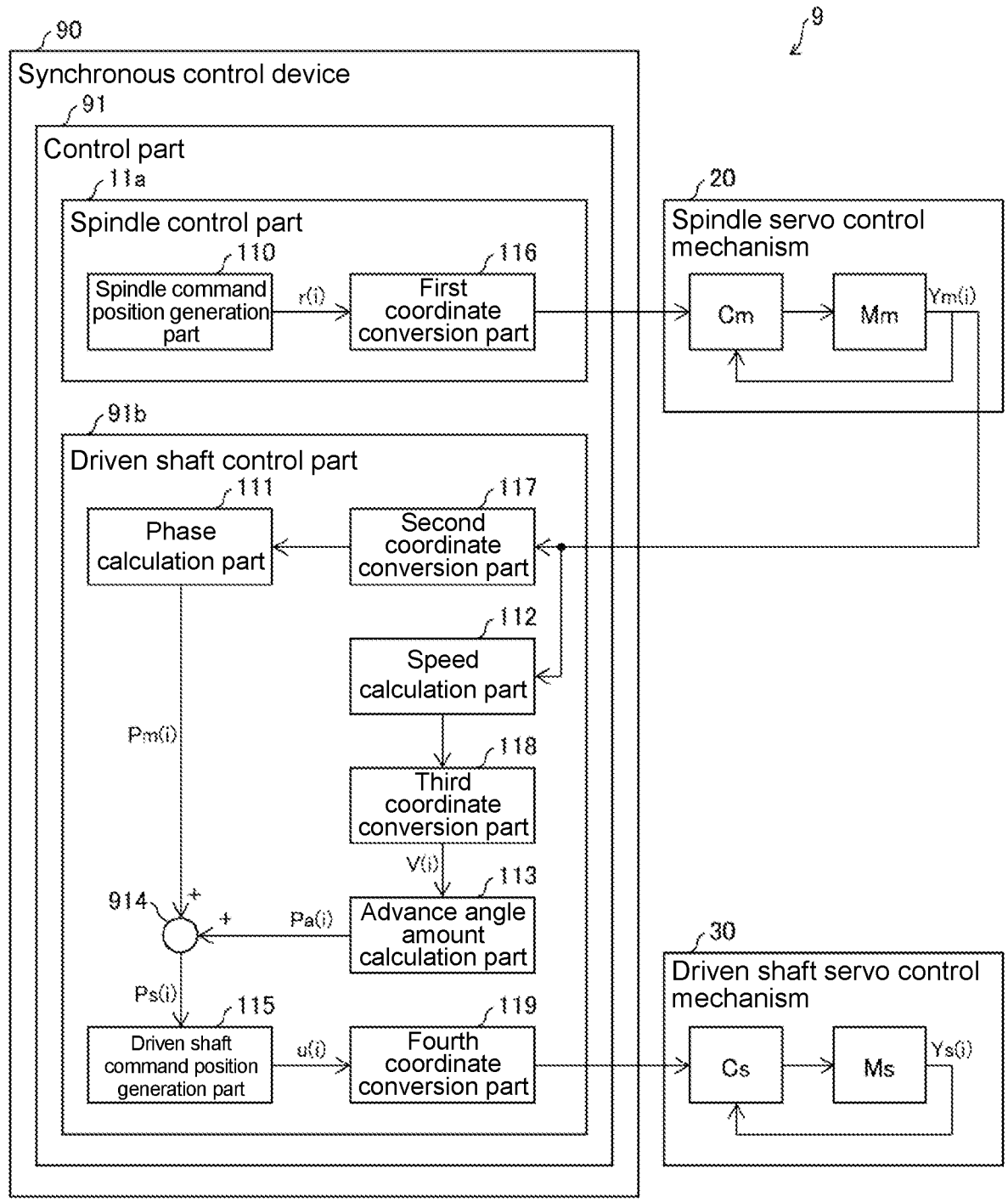

FIG. 8 is a control block diagram showing a control logic of the synchronous control system and the synchronous control device of the comparative example.

DESCRIPTION OF THE EMBODIMENTS

Embodiment 1

Hereinafter, an embodiment according to an aspect of the disclosure (hereinafter also referred to as "this embodiment") will be described with reference to the drawings.

§ 1 Application Example

An example of a situation to which the disclosure is applied will be described with reference to FIG. 1.

Figure 1:
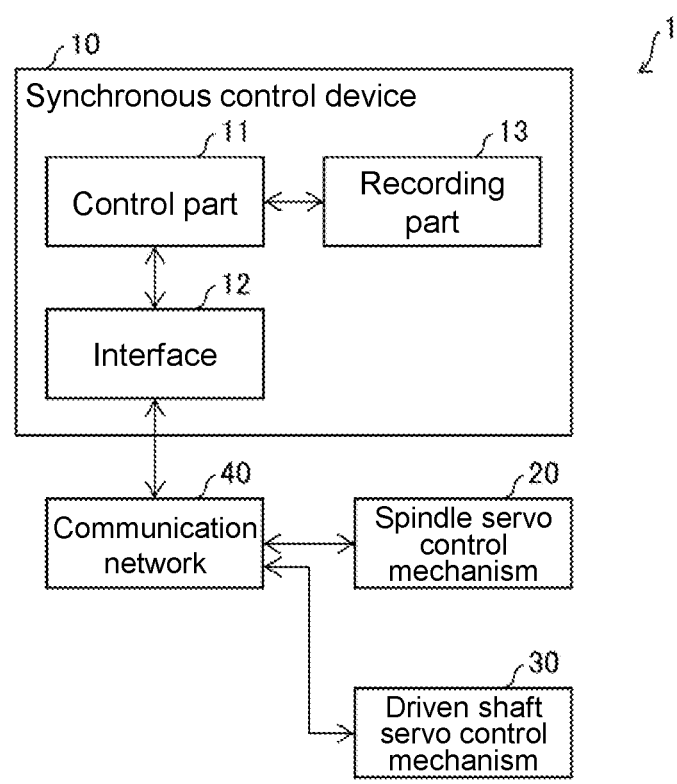
FIG. 1 is a schematic view showing a synchronous control system and a synchronous control device according to Embodiment 1 of the disclosure.

FIG. 1 is a schematic view showing an overall device configuration of a synchronous control system 1 according to this embodiment. The synchronous control system 1 includes a synchronous control device 10 according to this embodiment, a spindle servo control mechanism 20, a driven shaft servo control mechanism 30, and a communication network 40 which mediates communication among each of the devices.

Although this embodiment describes an example in which the synchronous control device 10 controls two control target devices, i.e., the spindle servo control mechanism 20 and the driven shaft servo control mechanism 30, the synchronous control device 10 may control more devices.

The synchronous control device 10 has a control part 11, an interface 12, and a recording part 13. The interface 12 communicates with other devices via the communication network 40. The recording part 13 may store a motion control program or the like for execution by the control part 11. Further, the recording part 13 may hold parameters related to a synchronous control method of the disclosure corresponding to various control target devices (at least the driven shaft servo control mechanism).

The control part 11 includes a spindle control part which outputs a signal based on a spindle command position to the spindle servo control mechanism 20, and a driven shaft control part which receives a spindle feedback position in the spindle servo control mechanism 20 and outputs a signal based on a driven shaft command position to the driven shaft servo control mechanism 30.

In some situations, the driven shaft control part generates the driven shaft command position corresponding to the spindle feedback position by adding, as a correction amount, an advance angle amount corresponding to a spindle speed calculated from the spindle feedback position. This corresponds to the conventional advance angle correction technique.

On the other hand, in some situations, the driven shaft control part generates the driven shaft command position so that a direction of a change in the driven shaft command position does not differ from a direction of a change in the spindle feedback position.

Specifically, the driven shaft control part calculates a projected driven shaft command phase obtained by adding the advance angle amount to a spindle phase, and generates the projected driven shaft command phase as a driven shaft command phase in a case where a sign (positive/negative) of a spindle speed is reverse from the previous period.

In addition, in a predetermined case where the sign of the spindle speed is not reverse from the previous period, the driven shaft control part generates, as the driven shaft command phase, a value in which a sign of a shift from the driven shaft command phase in the previous period is not reverse from the sign of the spindle speed, and on this basis, generates the driven shaft command position.

In the conventional advance angle correction technique, for example, even though the movement of the spindle is unidirectional, a driven shaft command position which reverses the driven shaft may be generated. The synchronous control device 10 of this embodiment suppresses such an inappropriate command to the driven shaft and realizes synchronous control which further improves the accuracy of synchronous driving of the driven shaft.

The synchronous control device 10 is, for example, a programmable logic controller (PLC). The recording part 13 is, for example, a semiconductor memory, a magnetic memory such as a hard disk, or another recording medium. The spindle servo control mechanism 20 and the driven shaft servo control mechanism 30 are, for example, a servo control stage and a robot arm. More specifically, the operation of grasping a work on the servo control stage by the robot arm may be mentioned as an example requiring synchronous control, but the disclosure is not limited to such specific control target devices and is applicable to any spindle servo control mechanism and driven shaft servo control mechanism.

§ 2 Configuration Example

Figure 2:
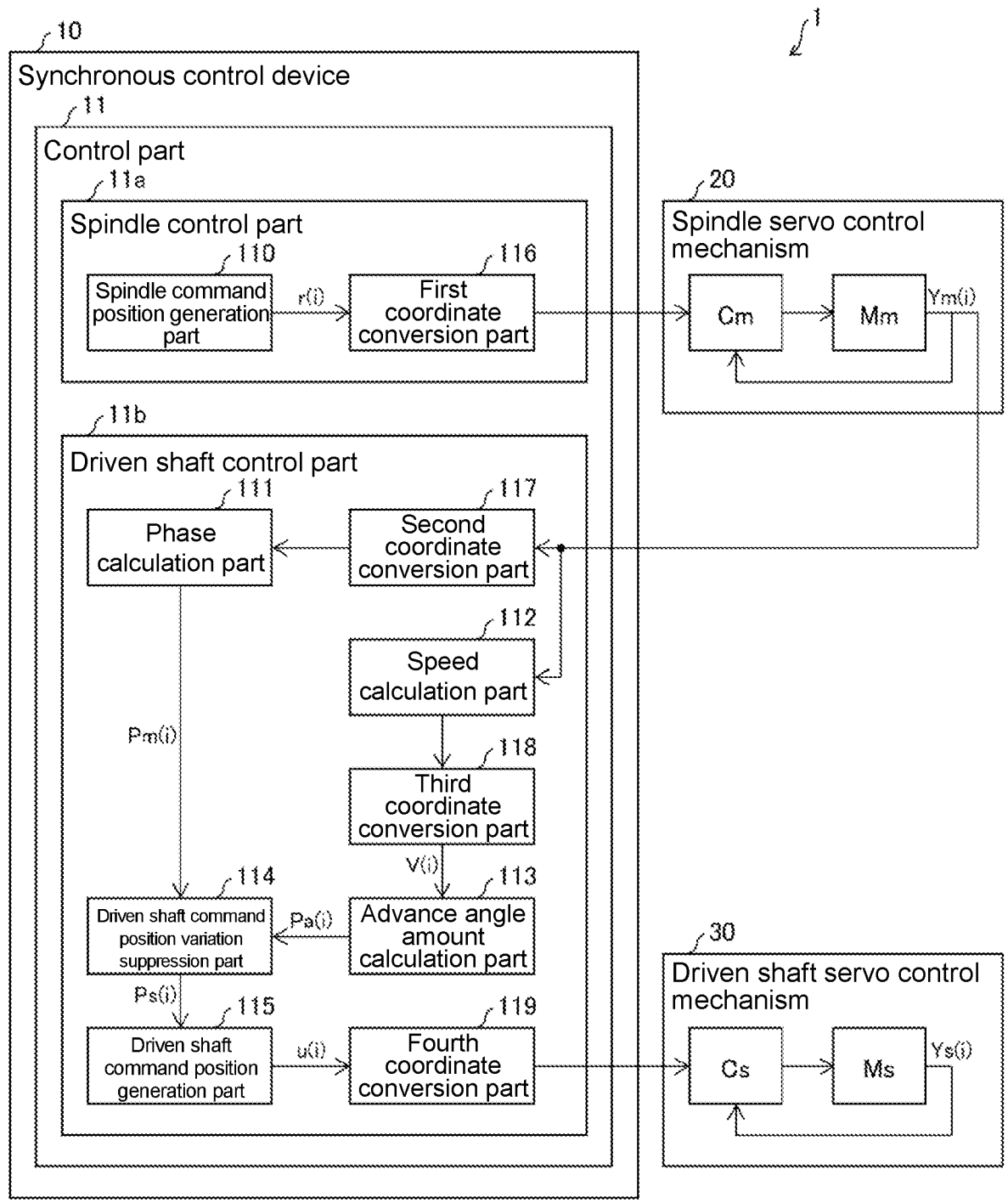
FIG. 2 is a control block diagram showing a control logic of the synchronous control system and the synchronous control device according to Embodiment 1 of the disclosure.

A configuration example of the synchronous control system 1 according to this embodiment and the synchronous control device 10 according to this embodiment will be described with reference to FIG. 2. FIG. 2 is a control block diagram showing a control logic when the synchronous control device 10 according to Embodiment 1 controls the spindle servo control mechanism 20 and the driven shaft servo control mechanism 30.

The spindle servo control mechanism 20 of the synchronous control system 1 includes a spindle motor Mm (spindle) such as a servo motor, and a spindle motor control part Cm which controls the spindle motor Mm. The spindle motor Mm is provided with, for example, an encoder to output a spindle feedback position Ym, i.e., position information of the spindle. According to a command signal based on a spindle command position r from the synchronous control device 10, the spindle motor control part Cm performs feedback control of the spindle motor Mm using the spindle feedback position Ym.

The driven shaft servo control mechanism 30 of the synchronous control system 1 includes a driven shaft motor Ms (driven shaft) such as a servo motor, and a driven shaft motor control part Cs which controls the driven shaft motor Ms. The driven shaft motor Ms is provided with, for example, an encoder to output a driven shaft feedback position Ys, i.e., position information of the driven shaft. According to a command signal based on a driven shaft command position u from the synchronous control device 10, the driven shaft motor control part Cs performs feedback control of the driven shaft motor Ms using the driven shaft feedback position Ys.

In the synchronous control device 10 of the synchronous control system 1, the control part 11 includes a spindle control part 11a and a driven shaft control part 11b. The spindle control part 11a outputs a command signal based on the generated spindle command position r to the spindle servo control mechanism 20. The driven shaft control part 11b receives the spindle feedback position Ym and outputs a command signal based on the generated driven shaft command position u to the driven shaft servo control mechanism 30.

The spindle control part 11a is provided with a spindle command position generation part 110 and a first coordinate conversion part 116 as functional blocks. The driven shaft control part 11b is provided with a phase calculation part 111, a speed calculation part 112, an advance angle amount calculation part 113, a driven shaft command position variation suppression part 114, a driven shaft command position generation part 115, a second coordinate conversion part 117, a third coordinate conversion part 118, and a fourth coordinate conversion part 119 as functional blocks. In other words, the control part 11 realizes the functions of each of these parts as functional blocks by executing the motion control program held in the recording part 13, for example.

The spindle command position generation part 110 reads the motion control program or the like which specifies operations of the spindle or the like and is stored in the recording part 13, and on this basis, generates the spindle command position r for each period (spindle command position calculation step).

The first coordinate conversion part 116 converts the spindle command position r, which is an internal representation in the control part 11, into a command signal corresponding to the spindle servo control mechanism 20, and outputs to the spindle servo control mechanism 20. The spindle command position r and the command signal outputted to the spindle servo control mechanism 20 are corresponding signals although their representation formats may be different.

The second coordinate conversion part receives the spindle feedback position Ym from the spindle servo control mechanism 20 and converts the spindle feedback position Ym into an internal representation in the control part 11. The spindle feedback position Ym and the internal representation of the spindle feedback position Ym in the control part 11 are corresponding signals although their representation formats may be different.

The phase calculation part 111 generates a spindle phase Pm based on the internal representation of the spindle feedback position Ym (spindle phase calculation step). The internal representation of the spindle feedback position Ym and the spindle phase Pm are corresponding signals although their representation formats may be different.

The speed calculation part 112 receives the spindle feedback position Ym from the spindle servo control mechanism 20 and outputs a signal representing the speed of the spindle calculated from a signal sequence of the spindle feedback position Ym of each period. Further, the third coordinate conversion part converts the signal representing the speed of the spindle calculated by the speed calculation part 112 into a spindle speed V which is an internal representation in the control part 11 (spindle speed calculation step). The signal representing the speed of the spindle calculated by the speed calculation part 112 and the spindle speed V are corresponding signals although their representation formats may be different.

The advance angle amount calculation part calculates an advance angle amount Pa corresponding to the spindle speed V (advance angle amount calculation step). In a typical case, the advance angle amount Pa is a value K·V obtained by multiplying the spindle speed V by a proportional coefficient K.

The driven shaft command position variation suppression part 114 calculates a driven shaft command phase Ps from the spindle phase Pm and the advance angle amount Pa (projected driven shaft command phase calculation step and driven shaft command position variation suppression step).

The driven shaft command position generation part 115 converts the driven shaft command phase Ps into the driven shaft command position u (driven shaft command position generation step). The driven shaft command phase Ps and the driven shaft command position u are corresponding signals although their representation formats may be different.

The fourth coordinate conversion part 119 converts the driven shaft command position u, which is an internal representation in the control part 11, into a command signal corresponding to the driven shaft servo control mechanism 30, and outputs to the driven shaft servo control mechanism 30. The driven shaft command position u and the command signal outputted to the driven shaft servo control mechanism 30 are corresponding signals although their representation formats may be different.

FIG. 2 shows signals passed from functional blocks to other functional blocks in a specific period i. Herein, the symbol "i" is an index of the period.

For example, in the period i, the spindle command position generation part 110 outputs a spindle command position r(i), and the spindle motor Mm outputs a spindle feedback position Ym(i). Also, in the period i, the driven shaft command position generation part 115 outputs a driven shaft command position u(i), and the driven shaft motor Ms outputs a driven shaft feedback position Ys(i).

In a period i+1 following the period i, each functional block outputs a signal of a next timing of the period i, respectively.

§ 3 Operation Example

As mentioned above, the spindle phase Pm, which is a signal corresponding to the spindle feedback position Ym, and an advance angle amount Pa for compensating for synchronization delay of the driven shaft are inputted to the driven shaft command position variation suppression part 114. Then, the driven shaft command position variation suppression part 114 calculates the driven shaft command phase Ps from these signals.

Figure 3:
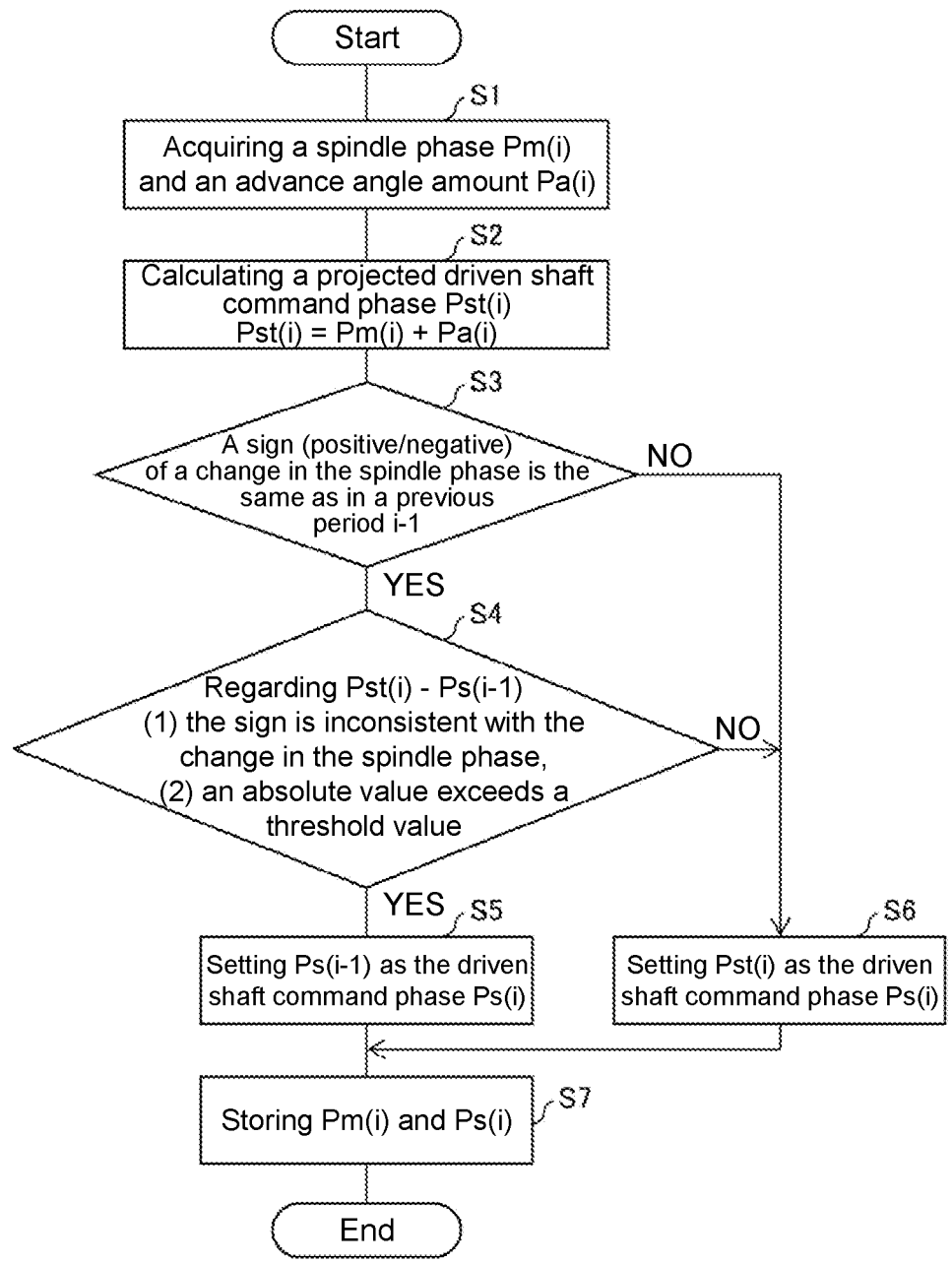
FIG. 3 is a flowchart for describing operations of a driven shaft command position generation part of a control part in the synchronous control device according to Embodiment 1 of the disclosure.

FIG. 3 is a flowchart showing operations of the driven shaft command position variation suppression part 114 in the period i.
(Step S1)

In step S1, the driven shaft command position variation suppression part 114 acquires a spindle phase Pm(i) from the phase calculation part 111, and acquires an advance angle amount Pa(i) from the advance angle amount calculation part 113.
(Step S2)

Subsequently, in step S2, the driven shaft command position variation suppression part 114 calculates a projected driven shaft command phase Pst(i) which is a sum of the spindle phase Pm(i) and the advance angle amount Pa(i) (projected driven shaft command phase calculation step).
(Step S3)

Subsequently, in step S3, the driven shaft command position variation suppression part 114 determines whether a sign of a change in the spindle phase is the same as in a period i−1 which is a previous period. In other words, it is determined whether an operation direction of the spindle is constant.

Herein, for example, the driven shaft command position variation suppression part 114 may determine whether the sign of the change Pm(i−1)−Pm(i−2) in the spindle phase with respect to the period i−1 is the same as the sign of the change Pm(i)−Pm(i−1) in the spindle phase with respect to the period i.

Alternatively, by using the advance angle amount Pa which is a quantity proportional to the spindle speed V, the driven shaft command position variation suppression part 114 may determine whether a sign of an advance angle amount Pa(i−1) of the period i−1 is the same as a sign of an advance angle amount Pa(i) of the period i.

If it is determined as "not the same" in step S3 (NO), the process proceeds to step S6, and if it is determined as "the same" (YES), the next operation (step S4) is performed.
(Step S4)

In step S4, regarding the change (shift) of the projected driven shaft command phase Pst(i) from a driven shaft command phase Ps(i−1) which is the output of the previous period, the driven shaft command position variation suppression part 114 determines whether the following conditions are satisfied: the sign is inconsistent with the sign of the change in the spindle phase (Condition 1), and an absolute value exceeds a predetermined threshold value d (Condition 2).

Whether the sign is inconsistent with the sign of the change in the spindle phase may be determined specifically by whether the sign of a value Pst(i)−Ps(i−1) is inconsistent with the sign of a change Pm(i)−Pm(i−1) in the spindle phase with respect to the period i.

Alternatively, whether the sign of the value Pst(i)−Ps(i−1) and the sign of the advance angle amount Pa(i) are inconsistent may be determined.

Whether the absolute value exceeds the predetermined threshold value d may be determined specifically by whether an inequality |Pst(i)−Ps(i−1)|>d is satisfied.
(Step S5)

If it is determined in step S4 that the conditions are satisfied (YES), the process proceeds from step S4 to step S5. In step S5, the driven shaft command position variation suppression part 114 outputs the driven shaft command phase Ps(i−1) of the previous period as a driven shaft command phase Ps(i).
(Step S6)

If it is not determined in step S4 that the conditions are satisfied (NO), the process proceeds from step S4 to step S6. If it is not determined in step S3 that the condition is satisfied (NO), the process proceeds from step S3 to step S6. In step S6, the driven shaft command position variation suppression part 114 outputs the projected driven shaft command phase Pst(i) as the driven shaft command phase Ps(i).
(Step S7)

In step S7 following step S5 or step S6, the driven shaft command position variation suppression part 114 stores the spindle phase Pm(i) and the calculated driven shaft command phase Ps(i) of the period i. If the advance angle amount Pa of the previous period is used in the determination in step S3, the advance angle amount Pa(i) is further stored. Although not shown in the flowchart of FIG. 3, the spindle phase Pm(i) and the driven shaft command phase Ps(i) which have been stored may be deleted at an appropriate timing after the period i+1.

The driven shaft command position variation suppression part 114 executes the above series of process flow for each period.

Accordingly, the driven shaft command position variation suppression part 114 generates the driven shaft command phase Ps(i) by performing case classification according to the operation flow of step S3 to step S6 (driven shaft command position variation suppression step).

§ 4 Effect and Action

To describe the effects and actions of the synchronous control system 1 and the synchronous control device 10 according to this embodiment, first, configurations of a synchronous control system 9 and a synchronous control device 90 of a comparative example are shown. For convenience of illustration, the same reference numerals are labeled on components having the same functions as the components described in the above embodiment, and descriptions thereof will not be repeated.

FIG. 8 is a control block diagram showing a control logic of the synchronous control system 9 of the comparative example. Compared to the synchronous control system 1 of FIG. 2, an addition part 914 of a driven shaft control part 91b of a control part 91 of the synchronous control device 90 replaces the driven shaft command position variation suppression part 114, and the rest are the same.

In other words, in the synchronous control device 90 of the comparative example, the difference from the synchronous control device 10 according to this embodiment lies in that the value obtained by adding the advance angle amount Pa(i) as the correction amount to the spindle phase Pm(i) is always taken as the driven shaft command phase Ps(i).

FIG. 4 is a graph showing the spindle phase Pm and the driven shaft command phase Ps over time of a result example of performing synchronous control. (a) of FIG. 4 shows the result of performing synchronous control by the synchronous control device 10 according to this embodiment, and (b) of FIG. 4 shows the result of performing synchronous control by the synchronous control device 90 of the comparative example. For reference, in each graph, the driven shaft command phase in the case where advance angle correction is not performed is indicated by a dotted line.

The synchronous control in FIG. 4 is in an example in which the spindle command position r is given in the following manner: the spindle advances in the positive direction at a constant speed until a period i=6, and after the period i=6, the spindle continues to advance in the positive direction at a constant reduced speed. Accordingly, the spindle command position r of always advancing in the positive direction is given to the spindle servo control mechanism 20, and the spindle phase Pm also changes in the same manner.

In both the synchronous control device 10 of (a) of FIG. 4 and the synchronous control device 90 of the comparative example of (b) of FIG. 4, it is shown that synchronization delay of the driven shaft is suppressed as compared to the synchronous control without advance angle correction indicated by the dotted line.

In the synchronous control device 90 of the comparative example of (b) of FIG. 4, when the speed of the spindle changes, an unnatural driven shaft command phase Ps (driven shaft command position u) of advancing the driven shaft in the negative direction is generated. On the other hand, in the synchronous control device 10 according to this embodiment of (a) of FIG. 4, a driven shaft command phase Ps of advancing the driven shaft in the negative direction is not generated.

As described above, the synchronous control device 10 according to this embodiment suppresses generation of an unnatural driven shaft command position u which advances the driven shaft in the negative direction even though the spindle is always advancing in the positive direction when the speed of the spindle changes. In other words, in the case where the movement of the spindle is not reversed, control is performed so that the driven shaft command position u is similarly not reversed, except for the case where the shift of the driven shaft command position u is equal to or less than a predetermined value (the shift of the driven shaft command phase is equal to or less than the threshold value).

As shown in the example of FIG. 4, when the speed of the spindle decreases sharply, the advance angle amount Pa also decreases sharply. Therefore, a change by the value Pm+Pa obtained by correcting the spindle phase Pm with the advance angle amount Pa is reverse to the movement of the spindle. In the synchronous control device 90 of the comparative example, since the driven shaft command phase Ps is generated based on the value Pm+Pa, such an unnatural driven shaft command phase Ps is generated.

On the other hand, in the synchronous control device 10 according to this embodiment, in a period i=7, in step S3 of the flowchart of FIG. 3, it is determined that the movement of the spindle is not reversed, and further, in Condition 1 of step S4, it is determined that the sign of the value Pst(7)−Ps(6) is inconsistent with the sign of the change in the spindle phase. Therefore, instead of a projected driven shaft command phase Pst(7) corrected by an advance angle amount Pa(7), the value of the previous driven shaft command phase Ps(6) is maintained and given as the driven shaft command phase Ps(7).

In other words, in (1) of step S4, the driven shaft command position variation suppression part 114 determines whether it will be a situation giving an unnatural driven shaft command position u which is reverse to the movement of the spindle when the value Pm+Pa is given as the driven shaft command phase Ps.

Then, in the synchronous control device 10, when it is determined this way, in step S5, the driven shaft command position variation suppression part 114 maintains and outputs the driven shaft command phase Ps at the previous value (ratchet operation).

If the magnitude of the change, from the previous driven shaft command phase Ps, of the value Pm+Pa obtained by correcting the spindle phase Pm with the advance angle amount Pa is smaller than the predetermined threshold value d, it does not trigger such a ratchet operation, and rather, the control does not reflect the correction value, which is not preferable. Therefore, the driven shaft command position variation suppression part 114 also takes into account the determination of Condition 2 in step S4.

As described above, according to the synchronous control system 1 and the synchronous control device 10 of this embodiment, it is possible to realize synchronous control which further improves the accuracy of synchronous driving of the driven shaft. While using the advance angle correction technique which suppresses synchronization delay of the driven shaft, the synchronous control suppresses generation of an unnatural driven shaft command position which reverses the operation of the driven shaft even though the movement of the spindle is not reversed.

Embodiment 2

Other embodiments of the disclosure will be described below. For convenience of illustration, the same reference numerals are labeled on components having the same functions as the components described in the above embodiment, and descriptions thereof will not be repeated.

A synchronous control system and a synchronous control device according to Embodiment 2 are the same as those of Embodiment 1 except that the operation of step S5 in the flowchart of FIG. 3 is different. In Embodiment 2, the maintenance of the driven shaft command phase Ps at the time of the ratchet operation is not performed by using the driven shaft command phase Ps(i−1) itself of the previous period, but is performed by correcting the driven shaft command phase Ps(i−1) of the previous period correspondingly to the change in the spindle phase Pm to generate the driven shaft command phase Ps(i).

More specifically, in step S5 of the flowchart of FIG. 3, a value Ps(i−1)+(Pm(i)−Pm(i−1)) is generated as the driven shaft command phase Ps(i).

FIG. 5 is a result example of performing synchronous control. (a) of FIG. 5 shows the result of performing the synchronous control by the synchronous control device 10 according to Embodiment 1, and (b) of FIG. 5 shows the result of performing synchronous control by the synchronous control device according to Embodiment 2.

As shown in the figure, in the ratchet operation when the speed of the spindle changes, in the synchronous control device 10 according to Embodiment 1 of (a) of FIG. 5, the value of a driven shaft command phase Ps(6) of the previous period is maintained and outputted as a driven shaft command phase Ps(7) of a period i=7. On the other hand, in the synchronous control device according to Embodiment 2 of (b) of FIG. 5, the value corrected from the driven shaft command phase Ps(6) of the previous period according to the change in the spindle phase Pm is outputted as the driven shaft command phase Ps(7).

According to the synchronous control system and the synchronous control device according to Embodiment 2, while suppressing the synchronization delay, it is possible to realize synchronous control in which the driven shaft can more naturally follow the movement of the spindle when the movement of the spindle is accompanied by a speed change.

Embodiment 3

A synchronous control system and a synchronous control device according to Embodiment 3 are the same as those of Embodiment 1 except that the operation of step S4 in the flowchart of FIG. 3 is changed.

As a first example, Condition 2 of step S4 is changed to a condition that the spindle decelerates beyond a specific value (threshold value). More specifically, the condition may be set as follows: regarding a specified threshold value d1, an inequality $|(Pa(i)-Pa(i-1))/(Pa(i-1)-Pa(i-2))|>d1$ is satisfied.

(a) of FIG. 6 is a diagram for illustrating Condition 2 when performing synchronous control according to the first example. When the deceleration of the spindle from a period i=8 is small as shown by a graph a1, Condition 2 is not satisfied, the process proceeds to step S6, and the ratchet operation is not performed. When the deceleration of the spindle is large as shown by a graph a2, Condition 2 is satisfied, the process proceeds to step S5, and the ratchet operation is performed.

In the case where the first example is applied, it functions in the same manner as in the case of the synchronous control device 10 according to Embodiment 1.

As a second example, Condition 2 of step S4 is changed to a condition that the spindle decelerates beyond a specific value (threshold value) continuously for a predetermined period. More specifically, the condition may be set as follows: regarding specified threshold value d1 and period width w, an inequality $|(Pa(i)-Pa(i-j))/(Pa(i-j)-Pa(i-j-1))|>d1$ is satisfied for j throughout 0<j<w.

(b) of FIG. 6 is a diagram for illustrating Condition 2 when synchronous control is performed according to the second example. When the deceleration of the spindle from the period i=8 does not continue for the predetermined period as shown by a graph b1 but immediately returns to a speed close to the original speed, Condition 2 is not satisfied, the process proceeds to step S6, and the ratchet operation is not performed. When the deceleration of the spindle continues for the predetermined period as shown by a graph b2, Condition 2 is satisfied for the first time, the process proceeds to step S5, and the ratchet operation is performed.

In the case where the second example is applied, it is possible to prevent overwork of the ratchet when the spindle feedback speed changes due to temporary signal changes (chattering) or the like.

Further, the same effect as that of Embodiment 1 can be obtained by Embodiment 3.

Embodiment 4

FIG. 7 is a schematic view showing an overall device configuration of a synchronous control system 2 according to Embodiment 4. In addition to the functional blocks of the control part 11 according to Embodiment 1, a control part 51 of a synchronous control device 50 of the synchronous control system 2 is further provided with functional blocks of a model information acquisition part 52 and a threshold value information acquisition part 53.

Further, in addition to the configuration of the synchronous control system 1 in Embodiment 1, the synchronous control system 2 further includes a simulation device 60. The simulation device 60 transmits/receives information to/from the synchronous control device 50 via the communication network 40.

The simulation device 60 includes a simulation processing part 61, an interface 62, a recording part 63, a display part 64, a selection part 65, and a transmission part 66.

The simulation processing part 61 simulates the control system shown in the block diagram of FIG. 2.

The interface 62 communicates with other devices via the communication network 40.

The recording part 63 holds information such as types of various control target devices, a model of the spindle servo control mechanism 20 or the driven shaft servo control mechanism 30, and a model of a spindle control part 11a or a driven shaft control part 11b with respect to the various control target devices.

The display part 64 displays various information such as simulation results.

The selection part 65 selects models for simulation of the synchronous control system 2 from among the above various models for the various control target devices. In addition, an optimal threshold value d (or threshold value d1) is selected from multiple simulation results.

The transmission part 66 transmits information to the synchronous control device 50 via the interface 62.

Next, a method of using the simulation device 60 in the synchronous control system 2 will be described.

When a user instructs the types of the spindle servo control mechanism 20 and the driven shaft servo control mechanism 30 on which synchronous control is to be performed, the selection part 65 extracts the model of each part corresponding to the selected control target devices from the recording part 63. Then, in the simulation processing part 61, a simulation model of the control system shown in the block diagram shown in FIG. 2 is constructed.

Accordingly, in the simulation device 60, it is possible to freely simulate the operations of the synchronous control system 2 including the spindle servo control mechanism 20 and the driven shaft servo control mechanism 30 arbitrarily selected by the user. The simulation processing part 61 simulates the spindle feedback position Ym and the driven shaft feedback position Ys when the synchronous control system 2 performs synchronous control according to an appropriate motion control program or the like. The simulation result of the operations of the synchronous control system 2 by the simulation processing part 61 may be displayed on the display part 64 to be confirmed by the user.

Through simulation by the simulation device 60, it is possible to select an appropriate device for the target operation of the user. In addition, the user can examine in advance appropriate values for various parameters such as the threshold value d (or the threshold value d1), the period width w, the coefficient K, etc.

Further, in the simulation device 60, regarding the threshold value d (or the threshold value d1), the simulation processing part 61 automatically performs simulation for multiple different threshold values d (or threshold values d1). Then, the selection part 65 determines the optimal simulation result and extracts the threshold value d (or the threshold value d1).

Accordingly, after the selection of the device and the determination of the parameters performed automatically or by the user via the selection part 65, the transmission part 66 of the simulation device 60 may transmit information of the extracted threshold value d (or threshold value d1) and information of various other parameters to the synchronous control device 10 via the interface 62.

Further, the simulation device 60 may transmit the model information of the selected spindle control part 11a or driven shaft control part 11b to the synchronous control device 10.

In Embodiment 4, in addition to the functional blocks of the control part 11 according to Embodiment 1, the control part 51 of the synchronous control device 50 is further provided with at least the functional block of the threshold value information acquisition part 53. Further, the model information acquisition part 52 shown in FIG. 7 may also be provided in the control part 51.

The threshold value information acquisition part 53 of the synchronous control device 50 receives the information of the threshold value d (or the threshold value d1) and other information transmitted from the simulation device 60 via the interface 12.

Further, the threshold value information acquisition part 53 sets the threshold value d (or the threshold value d1) determined in the simulation device 60 to at least the driven shaft control part 11b of the control part 51. Further, the threshold value information acquisition part 53 may set the control part 51 based on other information received from the simulation device 60. In addition, the threshold value information acquisition part 53 stores such information in the recording part 13 as appropriate.

Accordingly, according to Embodiment 2, the user can construct the synchronous control system after sufficiently studying the selection of the device and the setting of the parameters, and the convenience of the user is enhanced.

When the user instructs from the selection part 65 the types of the spindle servo control mechanism 20 and the driven shaft servo control mechanism 30 on which synchronous control is to be performed, the simulation device 60 may acquire information such as the threshold value d (or the threshold value d1) and various other parameters appropriate for such a combination from a cloud server via an Internet line. Further, it is also preferable to provide a function of prompting the acquired threshold value d (or threshold value d1) and various other parameter values to the user in the display part 64 as recommended values.

Embodiment 5

In Embodiment 4, the recording part 63 included in the simulation device 60 has information such as the types of various control target devices, the model of the spindle control part 11a or the driven shaft control part 11b, the model of the spindle servo control mechanism 20 or the driven shaft servo control mechanism 30, and the threshold value d (or the threshold value d1). On the other hand, in Embodiment 5, such information is held by the synchronous control device 50 in the recording part 13.

Therefore, in the synchronous control system of Embodiment 5, even if the simulation device 60 is not provided, the control logic corresponding to the selected control target device can still be easily set in the control part 11 of the synchronous control device 10. In the synchronous control system 2 shown in FIG. 7, the configuration of the synchronous control system according to Embodiment 5 does not necessarily have to include the simulation device 60.

In Embodiment 5, in addition to the functional blocks of the control part 11 according to Embodiment 1, the control part 51 of the synchronous control device 50 is further provided with at least the functional block of the threshold value information acquisition part 53.

In the synchronous control device 10 according to Embodiment 5, the threshold value information acquisition part 53 sets the threshold value d (or the threshold value d1) held in the recording part 13 to the driven shaft control part 11b according to the driven shaft servo control mechanism 30 selected by the user's operation via a terminal or the like, and preferably according to the combination of the driven shaft servo control mechanism 30 and the spindle servo mechanism.

Further, the threshold value information acquisition part 53 may further set the control part 51 based on the above other information held in the recording part 13.

Alternatively, as a modification example, the control part 51 of the synchronous control device 10 according to Embodiment 5 may be further provided with the functional block of the model information acquisition part 52. The model information acquisition part 52 recognizes the type of at least the driven drive servo control mechanism 30 connected via the interface 12 through the communication network. Then, according to the recognized driven shaft servo control mechanism 30, the threshold value information acquisition part 53 may set to the driven shaft control part 11b the threshold value d (or threshold value d1) selected from the information of the threshold value d (or the threshold value d1) held in the recording part 13.

In addition, the control logic in the control part 11 may be set according to the combination of the spindle servo control mechanism 20 and the driven shaft servo control mechanism 30 recognized by the model information acquisition part 52.

Further, the synchronous control device 10 according to Embodiment 5 may preferably have the following function: the threshold value information acquisition part 53 acquires various parameters appropriate for the selected driven shaft servo control mechanism 30 or the combination of the spindle servo control mechanism 20 and the driven shaft servo control mechanism 30 from the cloud server via the Internet line, and sets them to the control part 11 or prompts them to the user as recommended values.

[Implementation Example by Software]

The functional blocks (in particular, the spindle command position generation part 110, the phase calculation part 111, the speed calculation part 112, the advance angle amount calculation part 113, the driven shaft command position variation suppression part 114, the driven shaft command position generation part 115, the first coordinate conversion part 116, the second coordinate conversion part 117, the third coordinate conversion part 118, the fourth coordinate conversion part 119, the model information acquisition part 52, and the threshold value information acquisition part 53) of the synchronous control device 10 may be implemented by logic circuits (hardware) formed in an integrated circuit (IC chip) or the like, or may be implemented by software.

In the latter case, the synchronous control device 10 includes a computer for executing commands of a program, i.e., software, which realizes each function. The computer includes, for example, one or more processors and a computer-readable recording medium which stores the program. Then, in the computer, the processor reads the program from the recording medium and executes the program to thereby achieve the objective of the disclosure. For example, a CPU (central processing unit) may be used as the processor. A "non-transitory tangible medium" such as a ROM (read only memory), a tape, a disk, a card, a semiconductor memory, a programmable logic circuit, etc. may be used as the recording medium Further, a RAM (random access memory) for developing the above program may be further provided. Further, the program may be supplied to the computer via any transmission medium (a communication network, a broadcast wave, etc.) capable of transmitting the program. It is noted that one aspect of the disclosure may also be implemented in the form of a data signal embedded in a carrier wave, in which the above program is embodied by electronic transmission.

[Summary]

A synchronous control device according to one aspect of the disclosure includes a spindle control part and a driven shaft control part. The spindle control part outputs a spindle command position to a spindle servo control mechanism. The driven shaft control part receives a spindle feedback position in the spindle servo control mechanism and outputs a driven shaft command position to a driven shaft servo control mechanism. The driven shaft control part includes: a phase calculation part which calculates a spindle phase based on the spindle feedback position; a speed calculation part which calculates a spindle speed based on the spindle feedback position; an advance angle amount calculation part which calculates an advance angle amount corresponding to the spindle speed; and a driven shaft command position generation part which generates the driven shaft command position based on a driven shaft command phase. The driven shaft control part further includes a driven shaft command position variation suppression part which calculates a projected driven shaft command phase obtained by adding the advance angle amount to the spindle phase, generates the projected driven shaft command phase as the driven shaft command phase in a case where a sign (positive/negative) of the spindle speed is reverse from a previous period, and generates as the driven shaft command phase a value in which a sign of a shift from the driven shaft command phase in the previous period is not reverse from the sign of the spindle speed in a predetermined case where the sign of the spindle speed is not reverse from the previous period.

According to the above configuration, it is possible to generate a driven shaft command position which is not reverse to the direction of the movement of the spindle, and it is possible to realize synchronous control which improves the accuracy of synchronous driving of the driven shaft.

In the synchronous control device according to the one aspect, the value in which a direction of a change from a driven shaft command phase in the previous period is not reversed may be the driven shaft command phase in the previous period.

According to the above configuration, a value for generating a driven shaft command position which is not reverse to the direction of the movement of the spindle can be specifically defined.

In the synchronous control device according to the one aspect, the predetermined case may be a case where a magnitude of a difference between the driven shaft command phase in the previous period and the projected driven shaft command phase exceeds a predetermined threshold value.

According to the above configuration, it becomes possible to set a parameter (threshold value) for further improving the accuracy of the control.

In the synchronous control device according to the one aspect, the predetermined case may be a case where a decrease in a magnitude of the spindle speed from the previous period exceeds a predetermined threshold value.

According to the above configuration, it becomes possible to set a parameter (threshold value) for further improving the accuracy of the control.

The synchronous control device according to the one aspect may further include a recording part and a threshold value information acquisition part. The recording part stores information of the threshold value corresponding to the driven shaft servo control mechanism for multiple models. The threshold value information acquisition part selects and acquires information of the threshold value from information of the threshold value for the multiple models stored in the recording part.

According to the above configuration, the user can easily set the synchronous control device corresponding to the driven shaft servo control mechanism.

The synchronous control device according to the one aspect may further include a threshold value information acquisition part which acquires information of the threshold value corresponding to the driven shaft servo control mechanism via a communication network.

According to the above configuration, the user can easily set the synchronous control device corresponding to the driven shaft servo control mechanism.

The synchronous control device according to the one aspect may further include a model information acquisition part which acquires model information of the driven shaft servo control mechanism connected to the synchronous control device. The threshold value information acquisition part may acquire information of the threshold value corresponding to model information acquired by the model information acquisition part.

According to the above configuration, the user can more easily set the synchronous control device corresponding to the driven shaft servo control mechanism.

A simulation device according to one aspect of the disclosure may be a simulation device connected to the control device according to the one aspect and include a simulation processing part, a selection part, and a transmission part. The simulation processing part simulates operations of the spindle control part, the driven shaft control part, the spindle servo control mechanism, and the driven shaft servo control mechanism with respect to multiple threshold values different from each other to perform simulation of the spindle feedback position in the spindle servo control mechanism and a driven shaft feedback position in the driven shaft servo control mechanism with respect to the multiple threshold values different from each other. The selection part selects an appropriate threshold value from multiple simulation results of the simulation processing part with respect to the multiple threshold values different from each other. The transmission part transmits information of the threshold value selected by the selection part to the synchronous control device.

According to the above configuration, prior to the construction of the synchronous control system, the user can select the driven shaft servo control mechanism and set its parameters, and in addition, it is possible to easily set the synchronous control device corresponding to the driven shaft servo control mechanism.

A synchronous control system according to one aspect of the disclosure may include the control device according to the one aspect, a spindle servo control mechanism connected to the synchronous control device, and a driven shaft servo control mechanism connected to the synchronous control device.

According to the above configuration, it is possible to generate a driven shaft command position which is not reverse to the direction of the movement of the spindle, and it is possible to realize synchronous control which improves the accuracy of synchronous driving of the driven shaft.

A synchronous control method according to one aspect of the disclosure includes the following steps. In a spindle command position calculation step, a spindle command position is calculated with respect to a spindle servo control mechanism. In a spindle phase calculation step, a spindle phase is calculated based on a spindle feedback position in the spindle servo control mechanism. In a spindle speed calculation step, a spindle speed is calculated based on the spindle feedback position. In an advance angle amount calculation step, an advance angle amount corresponding to the spindle speed is calculated. In a driven shaft command position generation step, a driven shaft command position is generated based on a driven shaft command phase. In a projected driven shaft command phase calculation step, a projected driven shaft command phase is calculated by adding the advance angle amount to the spindle phase. In a driven shaft command position variation suppression step, the projected driven shaft command phase is generated as the driven shaft command phase in a case where a sign of the spindle speed is reverse from a previous period, and a value in which a sign of a shift from the driven shaft command phase in the previous period is not reverse from the sign of the spindle speed is generated as the driven shaft command phase in a predetermined case where the sign of the spindle speed is not reverse from the previous period.

According to the above configuration, it is possible to generate a driven shaft command position which is not reverse to the direction of the movement of the spindle, and it is possible to realize synchronous control which improves the accuracy of synchronous driving of the driven shaft.

The disclosure is not limited to the above-described embodiments, and various modifications may be made within the scope of the claims. The technical scope of the disclosure also includes embodiments obtained by appropriately combining the technical means disclosed in the different embodiments.

DESCRIPTION OF REFERENCE NUMERALS 1, 2 Synchronous control system
10, 50 Synchronous control device
11, 51 Control part
11a Spindle control part
11b Driven shaft control part
110 Spindle command position generation part
111 Phase calculation part
112 Speed calculation part
113 Advance angle amount calculation part
114 Driven shaft command position variation suppression part
115 Driven shaft command position generation part
116 First coordinate conversion part
117 Second coordinate conversion part
118 Third coordinate conversion part
119 Fourth coordinate conversion part
52 Model information acquisition part
53 Threshold value information acquisition part
12 Interface
13 Recording part
20 Spindle servo control mechanism
Cm Spindle motor control part
Mm Spindle motor
30 Driven shaft servo control mechanism
Cs Driven shaft motor control part
Ms Driven shaft motor
40 Communication network
60 Simulation device
61 Simulation processing part
62 Interface
63 Recording part
64 Display part
65 Selection part
66 Transmission part
r Spindle command position
u Driven shaft command position
Ym Spindle feedback position
Ys Driven shaft feedback position
Pm Spindle phase
V Spindle speed
Pa Advance angle amount
Ps Driven shaft command phase

What is claimed is:

1. A synchronous control device comprising:
a processor configured to:
output a spindle command position to a spindle servo control mechanism;
receive a spindle feedback position in the spindle servo control mechanism; and
wherein the processor is configured to calculate a spindle phase based on the spindle feedback position,
calculate a spindle speed based on the spindle feedback position,
calculate an advance angle amount corresponding to the spindle speed, and
generate a driven shaft command position based on a driven shaft command phase, and
the processor is further configured to:
calculate a projected driven shaft command phase obtained by adding the advance angle amount to the spindle phase,
generate the projected driven shaft command phase as the driven shaft command phase in a predetermined case where a sign of the spindle speed is reverse from a previous period, wherein the sign refers to whether a value of the spindle speed is either positive or negative, and
generate the driven shaft command phase in the previous period as the driven shaft command phase in a predetermined case where the sign of the spindle speed is not reverse from the previous period,
output the generated driven shaft command phase to a driven shaft servo control mechanism to control a driven shaft motor according to the generated driven shaft command phase.

2. The synchronous control device according to claim 1, wherein the predetermined case is a case where a magnitude of a difference between the driven shaft command phase in the previous period and the projected driven shaft command phase exceeds a predetermined threshold value.

3. The synchronous control device according to claim 2, further comprising:
a recording medium which stores information of the threshold value corresponding to the driven shaft servo control mechanism for multiple models;
wherein the processor is further configured to select and acquire information of the threshold value from information of the threshold value for the multiple models stored in the recording medium.

4. The synchronous control device according to claim 3, wherein the processor is further configured to acquire model information of the driven shaft servo control mechanism connected to the synchronous control device, and acquire information of the threshold value corresponding to the acquired model information.

5. The synchronous control device according to claim 2, wherein the processor is further configured to acquire information of the threshold value corresponding to the driven shaft servo control mechanism via a communication network.

6. A simulation device, which is a simulation device connected to the synchronous control device according to claim 2, the simulation device comprising:

a second processor configured to:

simulate operations of the processor and the driven shaft servo control mechanism with respect to multiple threshold values different from each other to perform simulation of the spindle feedback position in the spindle servo control mechanism and a driven shaft feedback position in the driven shaft servo control mechanism with respect to the multiple threshold values different from each other;

select an appropriate threshold value from multiple simulation results of the simulation with respect to the multiple threshold values different from each other; and transmit information of the selected threshold value to the synchronous control device.

7. The synchronous control device according to claim 1, wherein the predetermined case is a case where a decrease in a magnitude of the spindle speed from the previous period exceeds a predetermined threshold value.

8. A synchronous control system comprising:

the synchronous control device according to claim 1;

a spindle servo control mechanism connected to the synchronous control device; and a driven shaft servo control mechanism connected to the synchronous control device.

9. A synchronous control method comprising:

a spindle command position calculation step of calculating a spindle command position with respect to a spindle servo control mechanism;

a spindle phase calculation step of calculating a spindle phase based on a spindle feedback position in the spindle servo control mechanism;

a spindle speed calculation step of calculating a spindle speed based on the spindle feedback position;

an advance angle amount calculation step of calculating an advance angle amount corresponding to the spindle speed;

a driven shaft command position generation step of generating a driven shaft command position based on a driven shaft command phase for controlling a driven shaft motor;

a projected driven shaft command phase calculation step of calculating a projected driven shaft command phase by adding the advance angle amount to the spindle phase; and a driven shaft command position variation suppression step of generating the projected driven shaft command phase as the driven shaft command phase in a predetermined case where a sign of the spindle speed is reverse from a previous period, and generating the driven shaft command phase in the previous period as the driven shaft command phase in a predetermined case where the sign of the spindle speed is not reverse from the previous period, wherein the sign refers to whether a value of the spindle speed is either positive or negative, controlling the driven shaft motor using the generated driven shaft command phase.

* * * * *